(12) United States Patent
Hosotani et al.

(10) Patent No.: US 6,198,637 B1
(45) Date of Patent: Mar. 6, 2001

(54) SWITCHING POWER SUPPLY CIRCUIT

(75) Inventors: Tatsuya Hosotani; Hiroshi Takemura, both of Muko (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/583,509

(22) Filed: May 31, 2000

(30) Foreign Application Priority Data

Jun. 4, 1999 (JP) .................................................. 11-158510

(51) Int. Cl.$^7$ .................................................. H02M 3/335
(52) U.S. Cl. ............................................ 363/19; 363/56.09
(58) Field of Search ................................ 363/16, 18, 19, 363/49, 55, 56.09; 323/901

(56) References Cited

U.S. PATENT DOCUMENTS

| 5,012,399 | * | 4/1991 | Takemura et al. | 363/18 |
| 5,978,234 | * | 11/1999 | Nagahira | 363/19 |
| 6,038,143 | * | 3/2000 | Miyazaki et al. | 363/19 |

FOREIGN PATENT DOCUMENTS 412666  4/1992 (JP) .

* cited by examiner

*Primary Examiner*—Jessica Han
(74) *Attorney, Agent, or Firm*—Ostrolenk, Faber, Gerb & Soffen, LLP

(57) ABSTRACT

A switching power supply circuit includes a transformer having a primary winding, a secondary winding, and a feedback winding, a switching element connected in series to a first of the primary winding, a control circuit disposed between a control terminal of the switching element and the feedback winding, a starting circuit connected between a second end of the primary winding and the control terminal of the switching element, and a rectifying/smoothing circuit connected to the secondary winding. The control circuit includes a first delay circuit for determining the time that elapses before the switching element is turned on by a voltage generated at the feedback winding, a control element driven to prevent the switching element from turning on or forcibly turn off the switching element, and a second delay circuit for changing a delay time such that, under rated load or under heavy load, the switching element is turned off by driving the control element after the switching element is turned on by the voltage generated at the feedback winding, and, under light load, the turn-on of the switching element is blocked by driving the control element before the switching element is turned on by the voltage generated at the feedback winding.

5 Claims, 3 Drawing Sheets

OUTPUT STABILIZING
POWER SUPPLY CIRCUIT

SWITCHING POWER SUPPLY CIRCUIT

BACKGROUND OF THE INVENTION

1. Field of the Invention

The present invention relates to switching power supply circuits, and more particularly, the invention relates to switching power supply circuits in which heat generation and power loss in the switching element can be reduced by performing intermittent switching operations under light load.

2. Description of the Related Art

FIG. 3 shows a conventional switching power supply circuit disclosed in Japanese Unexamined Patent Application Publication No. 4-12666, which can perform intermittent switching operations under light load.

In FIG. 3, a switching power supply circuit 1 has a DC power supply E, a switching unit 2, a switching control unit 3, a transformer T which includes a primary winding N1, a secondary winding N2, and a feedback winding Nb, a rectifying/smoothing circuit 4, a first photo coupler (PC) 5, a current detecting unit 6, an intermittent/continuous switching signal generating unit 7, and a second photo coupler 8. In this case, the power supply E is connected to the primary winding N1 of the transformer T via the switching unit 2. The switching control unit 3 is connected to the feedback winding Nb of the transformer T, and is also connected to the switching unit 2. The secondary winding N2 of the transformer T is connected to the rectifying/smoothing circuit 4, whose outputs are connected to the switching control unit 3 via the first photo coupler 5, and are also connected to output terminals Po via the current detecting unit 6. The current detecting unit 6 is connected to the intermittent/continuous switching signal generating unit 7, whose output is connected to the switching control unit 3 via the second photo coupler 8.

In the switching power supply unit 1 having such a structure, an output current is detected by the current detecting unit 6. First, when the current value detected by the current detecting unit 6 is large, that is, under rated load or heavy load, the intermittent/continuous switching signal generating unit 7 outputs a signal for directing continuous operations. This signal is input to the switching control unit 3 via the second photo coupler 8, and, according to the control of the switching control unit 3, the switching unit 2 performs continuous switching operations.

Meanwhile, when the current value detected by the current detecting unit 6 is small, that is, under light load, the intermittent/continuous switching signal generating unit 7 outputs a signal for directing intermittent operations. This signal is input to the switching control unit 3 via the second photo coupler 8, and, according to the control of the switching control unit 3, the switching unit 2 performs intermittent switching operations.

Usually, there are problems in that since the switching frequency significantly rises under light load, the switching element generates heat and switching loss increases. However, these problems can be solved by performing intermittent switching operations as described above.

In the switching power supply circuit 1, however, the signals for directing continuous operations and intermittent operations are output by using the current detecting unit 6 and the intermittent/continuous switching signal generating unit 7, and the output signals are fed back to the switching control unit 3 to perform the switching of intermittent/continuous operations. In this case, since it is necessary to dispose the current detecting unit 6 and intermittent/continuous switching signal generating unit 7, there are problems in that the structure of the switching power supply unit becomes complicated, and miniaturization of the circuit is thereby hindered and cost increases.

SUMMARY OF THE INVENTION

It is therefore an object of the present invention to provide a switching power supply circuit having a simple structure, in which intermittent switching operations can be performed under light load.

The switching power supply circuit comprises a transformer which has a primary winding, a secondary winding, and a feedback winding, a switching element connected in series to a first end of the primary winding, a control circuit disposed between a control terminal of the switching element and the feedback winding, a starting circuit connected between a second end of the primary winding and the control terminal of the switching element, and a rectifying/smoothing circuit connected to the secondary winding.

The control circuit includes a first delay circuit for determining the time that elapses before the switching element is turned on by a voltage generated at the feedback winding, a control element driven to prevent the switching element from turning on or forcibly turn off the switching element, and a second delay circuit for changing a delay time such that, under rated load or under heavy load, the switching element is turned off by driving the control element after the switching element is turned on by the voltage generated at the feedback winding, and, under light load, the turn-on of the switching element is blocked by driving the control element before the switching element is turned on by the voltage generated at the feedback winding.

With this arrangement, the switching power supply circuit of the present invention has a simple structure, in which intermittent switching operations under light load can be performed without the need for intermittent/continuous switching signals. As a result, heat generation and power loss of the switching element under the light load can be reduced.

In addition, the switching power supply circuit in accordance with the present invention is formed by connecting the output of the rectifying/smoothing circuit to an output stabilizing power supply circuit.

With this arrangement, in the switching power supply circuit of the present invention, even when intermittent switching operations are performed under light load, a high quality output in which output voltage ripple is small can be obtained.

For the purpose of illustrating the invention, there is shown in the drawings several forms which are presently preferred, it being understood, however, that the invention is not limited to the precise arrangements and instrumentalities shown.

BRIEF DESCRIPTION OF THE DRAWING(S)

DETAILED DESCRIPTION OF EMBODIMENTS OF THE INVENTION

Hereinafter, the preferred embodiments of the present invention are explained in detail with reference to the drawings.

Figure 1:
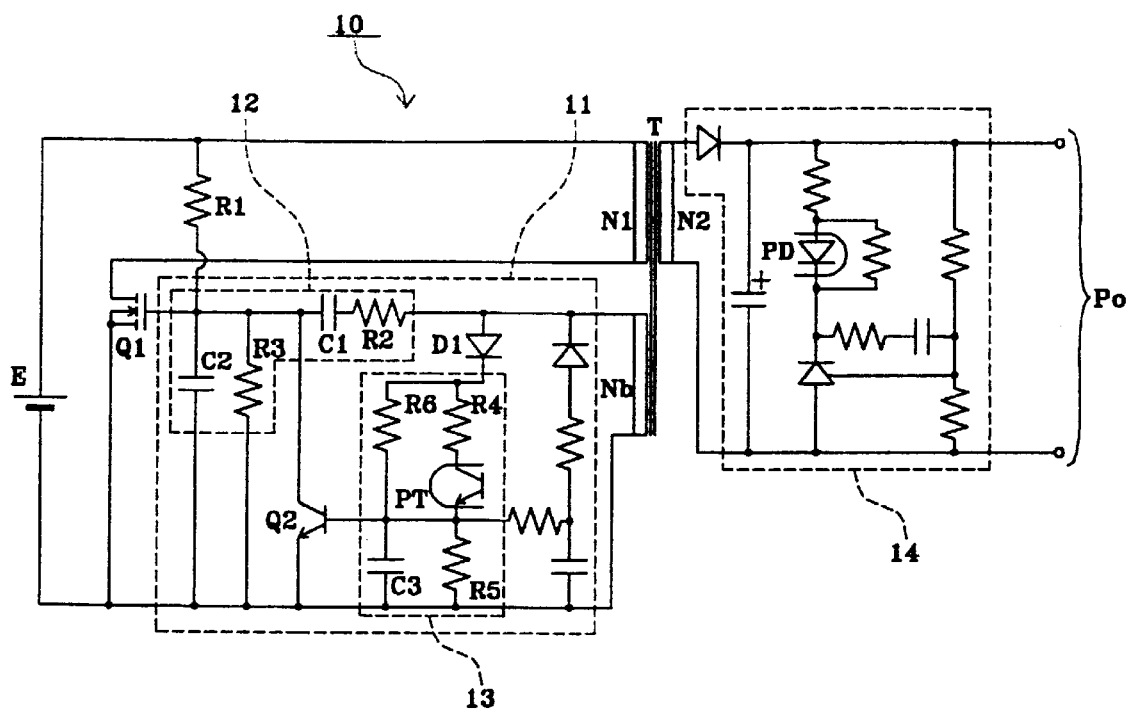
FIG. 1 is a circuit diagram of a switching power supply circuit according to an embodiment of the present invention.
Figure 3:
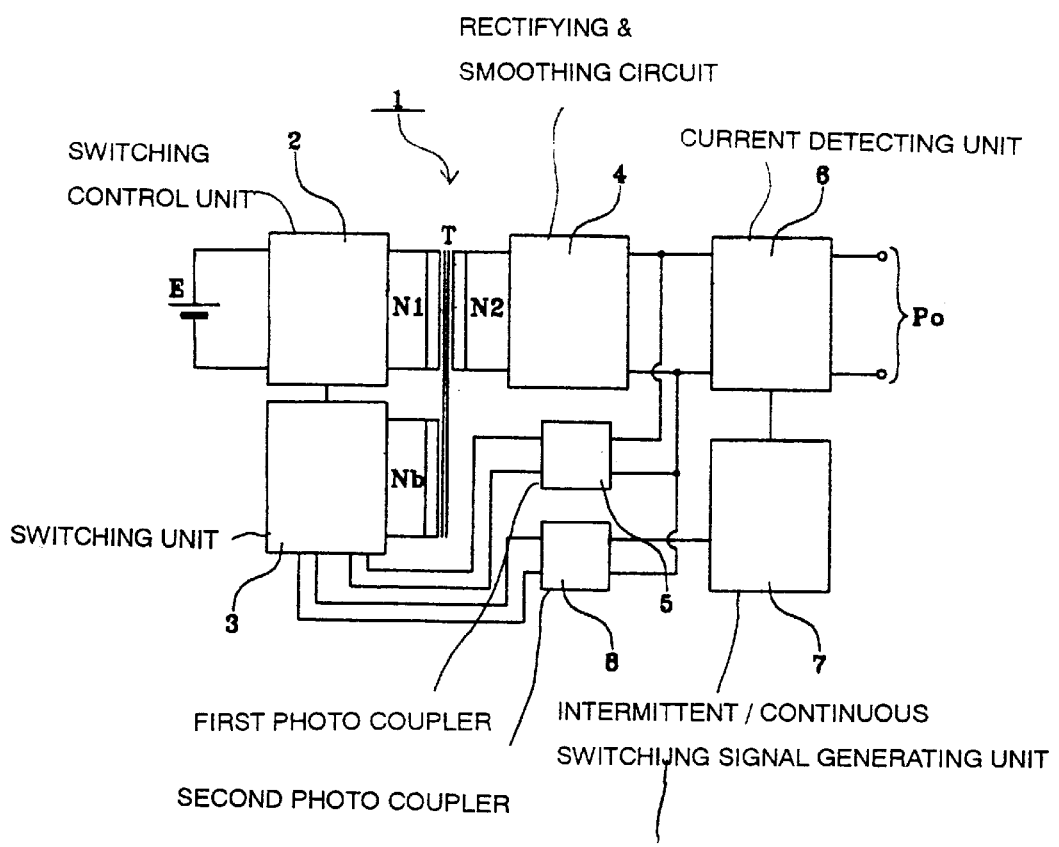
FIG. 3 is a circuit diagram of a conventional switching power supply circuit.

FIG. 1 shows a switching power supply circuit according to an embodiment of the present invention. In FIG. 1, the same reference numerals are given to the same parts as those shown in FIG. 3, and are given to the equivalent parts thereto. However, the explanation of the same and equivalent parts is omitted.

A switching power supply circuit 10 shown in FIG. 1 is a switching power supply circuit of the RCC (Ringing Choke Converter) system, in which an end of a first winding N1 of a transformer T is connected to the drain of an FET Q1 as a switching element, and the source of the FET Q1 is connected to the negative pole of a direct-current power supply E. In addition, the other end of the first winding N1 is connected to the positive pole of the direct-current power supply E. Furthermore, the positive pole of the direct-current power supply E is connected to the gate of the FET Q1 as a control terminal via a starting resistor R1 as a starting circuit. An end of a feedback winding Nb is connected to the gate of the FET Q1 via a control circuit 11, and the other end thereof is connected to the negative pole of the direct-current power supply E. In addition, a secondary winding N2 of the transformer T is connected to output terminals Po via a rectifying/smoothing circuit 14.

Next, a description will be given of the structure of the control circuit 11. First, the end of the feedback winding Nb is connected to the gate of the FET Q1 via a resistor R2 and a capacitor C1 connected in series. A point which connects the capacitor C1 and the gate of the FET Q1 is connected to the other end of the feedback winding Nb via a resistor R3 and a capacitor C2 disposed in parallel. In addition, the point connecting the capacitor C1 and the gate of the FET Q1 is connected to the collector of a transistor Q2 as a control element, and the emitter of the transistor Q2 is connected to the other end of the feedback winding Nb. In addition, the end of the feedback winding Nb is connected to the other end of the feedback Nb via a diode D1, a resistor R4, a photo transistor PT, and a resistor R5 disposed in series. A point at which the diode D1 and the resistor R4 are connected is connected to the other end of the feedback winding Nb via a resistor R6 and a capacitor C3 disposed in series. Furthermore, a point connecting the photo transistor PT and the resistor R5 is connected to the point connecting the resistor R6 and the capacitor C3, and is also connected to the base of the transistor Q2. In this situation, the resistors R2 and R3, the capacitors C1 and C2 form a first delay circuit 12. In addition, the resistors R4, R5, and R6, the capacitor C3, and the photo transistor PT form a second delay circuit 13.

In this case, as the capacitor C2 and the resistor R3, an input capacitance and a resistance value parasitically existing between the gate and source of the FET Q1 may be used, or alternatively, externally disposed components may be used. In addition, similarly, as the capacitor C3 and the resistor R5, an input capacitance and a resistance value parasitically existing between the base and emitter of the transistor Q2 may be used, or alternatively, externally disposed components may be used. Since the other structural parts of the control circuit 11 are typical ones, the detailed explanation thereof is omitted. Furthermore, although the transistor Q2 is used as the control element, the control element is not limited to a bipolar transistor, and an FET may be used as the control element.

Lastly, a description will be given of the structure of the rectifying/smoothing circuit 14. The rectifying/smoothing circuit 14 includes the photo diode PD for increasing and decreasing the amount of light emission through a linkage with an output voltage. Since the photo diode PD and the photo transistor PT of the control circuit 11 together forms a single photo coupler, the photo diode PD can transmit fluctuations of the output voltage to the control circuit 11. The explanation of the other structural parts of the rectifying/smoothing circuit 14 is omitted, since the other structural parts thereof are not relevant to the explanation of the present invention.

In the switching power supply circuit 10 having such a structure, the FET Q1 is turned on by a current supplied from the direct-current power supply E via the starting resistor R1 at the start-up of the circuit. However, in the normal state of switching, the FET Q1 is turned on by a voltage generated at the feedback winding Nb. In this case, since the first delay circuit 12 is disposed between the feedback winding Nb and the base of the FET Q1, the turn-on operation of the FET Q1 is delayed only for a fixed duration in time in which after a voltage is generated at the feedback winding Nb, a voltage between the gate and source of the FET Q1 increases and exceeds a threshold voltage according to a time constant determined by the resistors R2 and R3, and the capacitors C1 and C2 forming the first delay circuit 12.

In addition, the voltage generated at the feedback Nb to turn on the FET Q1, at the same time, flows into the second delay circuit 13 via the diode D1. The second delay circuit 13 is connected to the base of the transistor Q2 so as to drive the transistor Q2, and according to a time constant determined by the resistors R4, R5, and R6, the capacitor C3, and the photo transistor PT forming the second delay circuit 13, the second delay circuit 13 turns on the transistor Q2 after a certain duration in time. When the transistor Q2 is turned on, since the potential of the collector of the transistor Q2 is almost equal to the potential of the emitter, the gate potential of the FET Q1 connected to the collector rapidly decreases and the FET Q1 is thereby turned off. Usually, the time constants of the first delay circuit 12 and the second delay circuit 13 are set such that the transistor Q2 is turned on after a little while from the turn-on of the FET Q1.

The internal resistance of the photo transistor PT is linked with the photo diode PD included in the rectifying/smoothing circuit 14, and the internal resistance of the photo transistor PT is reduced when an output voltage increases. The reduction in the internal resistance of the photo transistor PT is equivalent to a decrease in the time constant of the second delay circuit 13. With this arrangement, the time that elapses from the turn-on of the FET Q1 to the turn-off thereof, that is, the ON-time of the FET Q1 is adjusted.

Furthermore, in the switching power supply circuit 10, the arrangement is such that the time constant of the second delay circuit 13 is shorter than that of the first delay circuit 12 under light load. In other words, under light load, an output voltage increases and the internal resistance of the photo transistor PT thereby reduces. In this case, the time constant of the second delay circuit 13 changes to be shorter than the time constant of the first delay circuit 12. As a result, since the transistor Q2 turns on before the FET Q1 turns on so that the gate potential of the FET Q1 does not increase, the FET Q1 is not turned on by a voltage generated at the feedback winding Nb, and the switching operation of the switching power supply circuit 10 thereby temporarily stops. Then, the transistor Q2 is again turned off by releasing of a charge stored in the capacitor C3. In this situation, since the time for releasing the charge stored in the capacitor C3 is much shorter than the time for starting the switching power supply circuit 10, after a fixed duration in time, the FET Q1 is turned on by a current flowing in via the starting resistor R1, and, again, the switching operation starts. Then, when the switching operation is started by the current flowing in via the starting resistor R1, the output voltage temporarily decreases, and the switching operation is thereby continuously performed for some time. After this, when the output voltage again increases, the above-described performance is repeated. In this situation, the time for starting up, which elapses before the FET Q1 is turned on by the current via the starting resistor R1 is much longer than the time for starting up, which elapses before the FET Q1 is turned on by the voltage generated at the feedback winding Nb. As a result, the FET Q1 performs intermittent switching operations, in which a continuous switching period and a switching suspension period are repeated.

In this way, in the switching power supply circuit 10, under light load, intermittent operations in which the switching is continued and suspended can be performed. In addition, by performing the intermittent operations, heat generation of the switching element can be suppressed, and power loss such as switching loss can be reduced. Furthermore, since this can be achieved by using a simplified structure, high efficiency, miniaturization, and cost reduction of the switching power supply circuit can be achieved.

In addition, by setting the time constants of the first delay circuit and the second delay circuit to appropriate values, under an arbitrary condition, changing between the continuous switching and the intermittent switching can be performed. Furthermore, since a cycle for the intermittent switching can be arbitrarily set by adjusting the time for starting the switching power supply circuit, it is also possible to prevent or reduce sound/noise generated from the switching power supply circuit when the cycle for the intermittent switching is in the range of audible frequencies.

Figure 2:
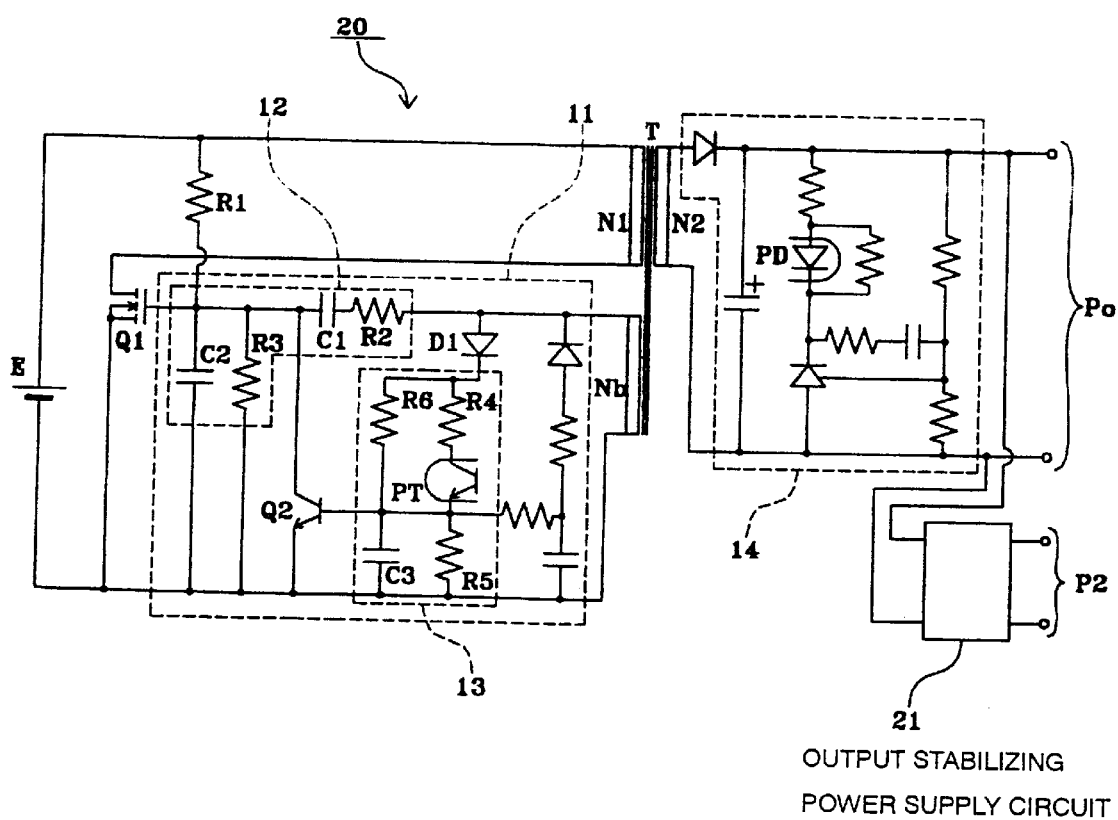
FIG. 2 is a circuit diagram of a switching power supply circuit according to another embodiment of the present invention.

Meanwhile, there is a problem in that the ripple of the output voltage increases when the switching power supply circuit performs the intermittent switching. Accordingly, in order to solve this problem, FIG. 2 shows a switching power supply circuit in accordance with another embodiment of the present invention. In FIG. 2, the same reference numerals are provided to the same parts as those in FIG. 1 and the equivalent parts thereto. The explanation of these parts in FIG. 2 is omitted.

In FIG. 2, a switching power supply circuit 20 is connected to an output stabilizing power supply circuit 21 parallel to output terminals Po, and the outputs of the circuit 21 are connected to second output terminals P2. The output stabilizing power supply circuit 21 may adopt either a linear system or a switching system.

In order to illustrate the operation of the switching power supply circuit 20, for example, it is assumed that an arrangement is made such that a voltage of +24 V is output from the output terminals Po, and a voltage of +5 V is output from the second output terminals P2. Usually, in the case of a load in which a high voltage such as +24 V is required, a large amount of current is often intermittently required, whereas, in the case of a load in which a voltage of +5 V is required, for example, a load such as a digital circuit, often continuously needs a voltage with a small capacity, high stability, and small ripple. Therefore, as in the case of the switching power supply circuit 20, an arrangement is made such that the voltage of +24 V is first produced to use as an input, and then, the voltage of +5 V is output by the output stabilizing power supply circuit 21. With this arrangement, even if the ripple of the output voltage of the output terminals Po is increased by the intermittent switching operations of the switching power supply circuit 20, the ripple of the output voltage of the second output terminals P2 can be reduced, and the voltage of +5 V can be supplied in a stabilized manner.

As described above, in the switching power supply circuit 20, even under light load, an output with high stability and small ripple can be obtained.

Although each of the above embodiments has the structure having a single secondary winding, a structure in which two or more secondary windings may be used to obtain a plurality of output voltages. In addition, a structure may be used in which the ripple of the output voltage under light load is reduced by disposing an output stabilizing power supply at the plurality of the outputs.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply circuit comprising a transformer having a primary winding, a secondary winding, and a feedback winding, a switching element connected in series to a first end of the primary winding, a control circuit disposed between a control terminal of the switching element and the feedback winding, a starting circuit connected between a second end of the primary winding and the control terminal of the switching element, and a rectifying/smoothing circuit connected to the secondary winding;

wherein the control circuit includes a first delay circuit for determining a time that elapses before the switching element is turned on by a voltage generated at the feedback winding, a control element driven to perform at least one of preventing the switching element from turning on and turning off the switching element, and a second delay circuit for changing a delay time such that, under rated load or under heavy load, the switching element is turned off by driving the control element after the switching element is turned on by the voltage generated at the feedback winding, and, under light load, the turn-on of the switching element is blocked by driving the control element before the switching element is turned on by the voltage generated at the feedback winding.

2. A switching power supply circuit of claim 1, wherein the output of the rectifying/smoothing circuit is connected to an output stabilizing power supply circuit.

3. The switching power supply circuit of claim 1, wherein the second delay circuit has a variable element for charging the delay time.

4. The switching power supply circuit of claim 3, wherein the variable element comprises a photo transistor coupled optically to a photo diode, the photo diode being coupled to the secondary winding and being responsive to charge in an output voltage of the secondary winding.

5. The switching power supply circuit of claim 1, wherein the first and second delay circuit comprise RC circuits.

* * * * *